(12) United States Patent
Takagi et al.

(10) Patent No.: US 7,757,255 B2
(45) Date of Patent: Jul. 13, 2010

(54) DIGITAL BROADCASTING RECEIVER

(75) Inventors: Toshihiro Takagi, Daito (JP); Masanori Kawai, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 345 days.

(21) Appl. No.: 11/474,969

(22) Filed: Jun. 27, 2006

(65) Prior Publication Data

US 2007/0250892 A1  Oct. 25, 2007

(30) Foreign Application Priority Data

Jun. 27, 2005  (JP) .............................. 2005-187208

(51) Int. Cl.
*H04N 7/10* (2006.01)
(52) U.S. Cl. .................... 725/50; 725/54; 725/152; 725/140; 725/131
(58) Field of Classification Search .................. 725/50, 725/54, 152, 140, 131
See application file for complete search history.

(56) References Cited

U.S. PATENT DOCUMENTS 5,534,941 A * 7/1996 Sie et al. ..................... 348/564
5,631,743 A * 5/1997 Inoue .......................... 386/95
6,556,251 B1 * 4/2003 Sorensen ..................... 348/564
2004/0133928 A1 * 7/2004 Jerding et al. ............... 725/152
2006/0064722 A1 * 3/2006 Michel et al. ................ 725/47
2006/0245446 A1 * 11/2006 Agusa et al. ................. 370/432

FOREIGN PATENT DOCUMENTS

JP  2000-115742  4/2000

* cited by examiner

*Primary Examiner*—Joseph R Hirl
*Assistant Examiner*—Jivka Rabovianski
(74) *Attorney, Agent, or Firm*—Pillsbury Winthrop Shaw Pittman, LLP

(57) ABSTRACT

A digital broadcasting receiver includes an operating section configured to select a channel, and a video/audio data obtaining section configured to obtain video/audio data on a selected channel from television broadcasting signals. The digital broadcasting receiver also includes a channel table and a designated channel table. The digital broadcasting receiver further includes a channel selecting section configured such that when the channel is selected by the operating section, the channel selecting section determines whether or not the selected channel has been replaced with an alternative channel by a broadcasting station by reference to the two tables. If it is determined that the selected channel has been replaced with the alternative channel, the channel selecting section instructs the video/audio data obtaining section to select the alternative channel instead of the selected channel.

3 Claims, 3 Drawing Sheets

| FORMER CHANNEL | FAVORITE CHANNEL | SourceID | f(Hz) |
|---|---|---|---|
| — | 101 | 0 × 002 | 114 |
| 100 | 103 | 0 × 004 | 108 |
| ⋮ | ⋮ | ⋮ | ⋮ |

FIG. 2A

| CH | SourceID | f(MHz) |
|---|---|---|
| .. | .. | .. |
| 100 | 0×001 | 108 |
| 101 | 0×002 | 114 |
| 102 | 0×003 | 114 |
| 103 | 0×004 | 108 |
| .... | .... | .... |

FIG. 2B

| FORMER CHANNEL | FAVORITE CHANNEL | SourceID | f(MHz) |
|---|---|---|---|
| — | 101 | 0×002 | 114 |
| — | 100 | 0×004 | 108 |
| ........ | ........ | ........ | ........ |

FIG. 2C

| FORMER CHANNEL | FAVORITE CHANNEL | SourceID | f(Hz) |
|---|---|---|---|
| — | 101 | 0×002 | 114 |
| 100 | 103 | 0×004 | 108 |
| ........ | ........ | ........ | ........ |

DIGITAL BROADCASTING RECEIVER

CROSS REFERENCE

This Nonprovisional application claims priority under 35 U.S.C.§119(a) on Patent Application No. 2005-187208 filed in Japan on Jun. 27, 2005, the entire contents of which are hereby incorporated by reference.

BACKGROUND OF THE INVENTION

The present invention relates to a digital broadcasting receiver capable of finding out a physical channel by reference to a channel table which provides correspondences between preset physical channels and broadcast programs (logical channels).

With a conventional TV (Television) receiver, the user is allowed to freely select and view a desired one of broadcast programs transmitted from a TV station to multiple homes. In recent years, attention has been focused on digital broadcasting which is capable of efficiently transmitting a multiplicity of programs using a limited frequency band by compression of video signals and the like, multiplex transmission and a like technique relying upon the digital compression and encoding technology.

The following description is directed to CATV (Cable Television) digital broadcasting as a representative of the digital broadcasting. In Japan for example, the CATV digital broadcasting has a maximum of four broadcasting channels (logical channels) for each of physical channels allotted to an actual CATV frequency band. Therefore, a physical channel number is not the same with an associated logical channel number in the CATV broadcasting. In Japan, the CATV digital broadcasting has a total of 113 physical channels each having a bandwidth of 6 MHz within a CATV frequency band of 93 to 767 MHz. The number of programs per physical channel is four at maximum and, hence, a total of 452 programs at maximum can be transmitted through the CATV digital broadcasting. Thus, the physical channels and the broadcast programs (logical channels) do not have a one-to-one correspondence therebetween and, therefore, the correspondence between the two does not satisfy a sufficient condition for determining a broadcast program from a physical channel selected.

In actual utilization, the user searches a CATV program table for a logical channel on which a desired broadcast program is transmitted and then instructs a CATV digital broadcasting receiver to be tuned to that logical channel via a remote controller or the like. In response to this instruction, the CATV digital broadcasting receiver references a channel table providing correspondences between preset physical channels and broadcast programs (logical channels) to find out the physical channel associated with the desired program. Subsequently, the CATV digital broadcasting receiver causes the tuner to perform channel selection based on the physical channel thus found out for digital demodulation. Further, the CATV digital broadcasting receiver extracts the broadcast program (logical channel) designated and restores image and sound to display the program on the television receiver. Thus, the operation of referencing the channel table is indispensable for the CATV digital broadcasting receiver.

Data described in the channel table (channel table data) is data transmitted from the CATV station as occasion arises. The channel table data includes data on the correspondence between a physical channel and an associated logical channel, data on the logical channel, and identification information for identifying a program to be broadcast on that logical channel in a straightforward manner. Such identification information is Source ID for example.

The aforementioned CATV digital broadcasting receiver allows the user to designate and register any desired logical channel. For example, if the user registers as a favorite channel a logical channel on which a user's favorite broadcast program is to be provided, the user can view the broadcast program immediately by merely selecting the favorite channel via a remote controller or the like without the need to check logical channels one by one in order to find out the logical channel providing the broadcast program.

A digital broadcasting receiver as described in Japanese Patent Laid-Open Publication No. 2000-115742 has been proposed.

However, the correspondences between broadcast programs and their respective logical channel numbers can often be changed due to change in program planning at the CATV station or a like factor. If the logical channel number associated with a favorite broadcast program that has been provided on the favorite channel is changed, the aforementioned CATV digital broadcasting receiver does not allow the user to view the favorite program even when the user selects the favorite channel (the logical channel that provided the favorite program before the channel number change) via the remote controller or the like.

For this reason, the user has to find out again the logical channel currently providing the favorite program in order to view the favorite program. This makes the user feel very troublesome.

The receiver described in Japanese Patent Laid-Open Publication No. 2000-115742 fails to take possible change in logical channel number into account. Therefore, this receiver also makes the user feel very troublesome, like the aforementioned CATV broadcasting receiver.

A feature of the present invention is to provide a digital broadcasting receiver configured such that even if the number of a logical channel that has been previously designated by the user as a channel providing a favorite broadcast program is replaced with an alternative logical channel number, the digital broadcasting receiver automatically selects the alternative logical channel number currently providing the favorite broadcast program.

SUMMARY OF THE INVENTION

A digital broadcasting receiver according to the present invention includes an operating section configured to select a channel, and a video/audio data obtaining section configured to receive television broadcasting signals, extract one of the television broadcasting signals provided on a selected channel, and obtain video data and audio data on the selected channel from the television broadcasting signal. The digital broadcasting receiver thus constructed is a CATV broadcasting receiver or a digital television receiver for example.

The digital broadcasting receiver also includes: a control data obtaining section configured to obtain control data transmitted from a broadcasting station; a channel table configured to store therein a channel and identification information for directly identifying a broadcast program provided on the channel in such a manner as to make the channel and the identification information correspond to each other based on the control data obtained by the control data obtaining section, the channel table allowing the channel and the identification information to be updated upon receipt of television broadcasting signals; and a designated channel table configured to store therein a previously designated channel and identification information associated with the previously designated channel in such a manner as to make the previously designated channel and the identification information correspond to each other, the previously designated channel and the identification information being extracted from the channel table. The control data is PSI (Program Specification Information)/SI (Service Information) for example. The identification information is a Source ID for example. The channel table is VCT (virtual channel table) The previously designated channel is, for example, a logical channel registered by the user as a favorite channel that provides a user's favorite broadcast program.

The digital broadcasting receiver further includes a channel selecting section configured such that when the channel stored in the designated channel table is selected by the operating section, the channel selecting section determines whether or not the selected channel has been replaced with an alternative channel by the broadcasting station by reference to the channel table and the designated channel table using identification information corresponding to the selected channel as a search key.

If it is determined that the selected channel has been replaced with the alternative channel by the broadcasting station, the channel selecting section instructs the video/audio data obtaining section to select the alternative channel instead of the selected channel.

With this feature, even when the number of a designated logical channel having provided a user's favorite program is changed to an alternative logical channel number, the channel selecting section automatically selects the alternative logical channel number currently providing the favorite program.

The foregoing and other features and attendant advantages of the present invention will become apparent from the reading of the following detailed description of the preferred embodiments in conjunction with the accompanying drawings.

BRIEF DESCRIPTION OF THE DRAWINGS

FIGS. 2A to 2C each show the contents stored in VCT 21 or favorite channel table 22.

DETAILED DESCRIPTION OF THE PREFERRED EMBODIMENTS

Hereinafter, a CATV digital broadcasting receiver embodying the present invention will be described in detail with reference to the accompanying drawings.

Figure 1:
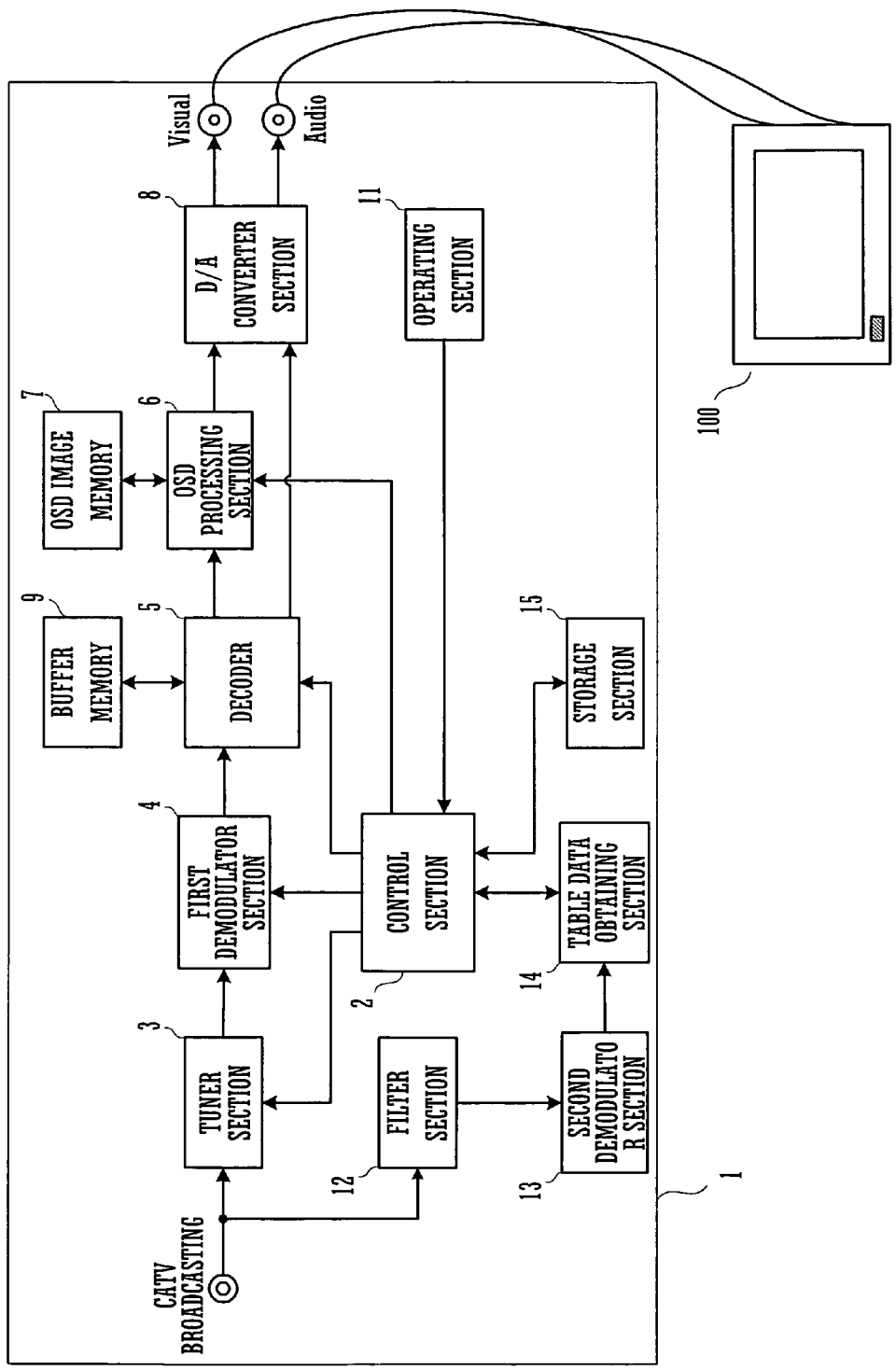
FIG. 1 is a block diagram showing a basic configuration of a CATV digital broadcasting receiver embodying the present invention.

FIG. 1 is a block diagram showing a basic configuration of the CATV digital broadcasting receiver embodying the present invention. The CATV digital broadcasting receiver 1 includes a control section 2 configured to control components of a receiver body 1, a tuner section 3 configured to receive television broadcasting signals, a first demodulator section 4 configured to demodulate the television broadcasting signals received into digital data, a decoder 5 configured to separate video data and audio data from the digital data thus demodulated and expand the video data and the audio data, buffer memory 9 configured to hold the digital data temporarily, an OSD processing section 6 configured to superimpose a desired OSD (On Screen Display) upon a video image formed based on the video data, OSD image memory 7 configured to store desired OSDs therein, a D/A converter section 8 configured to convert signals of video data and signals of audio data to respective analog signals, an operating section 11 corresponding to the operating section defined by the present invention, a filter section 12 configured to frequency-separate television broadcasting signals, a second demodulator section 13 configured to demodulate an output produced by the filter section 12 into digital data and perform error correction to obtain control data, a table data obtaining section 14 configured to restore channel table data from the control data thus obtained, and a storage section 15 configured to store therein the restored channel table data.

The control section 2 comprises a microcomputer for example.

When a command to power ON/OFF, channel (below, when simply stating "channel", this indicates a "logical channel") switching, or adjust the sound volume or a like command is inputted to the operating section 11, the operating section 11 transfer the command to the control section 2. The operating section 11 includes a remote controller.

The tuner section 3 extracts a television broadcast signal of a physical channel that corresponds to a channel selected by the control section 2 from the television broadcast signals transmitted from the CATV station, and outputs that extracted television broadcast signal.

The first demodulator section 4 demodulates the television broadcasting signal outputted from the tuner section 3 into a transport stream consisting of digital data and outputs the transport stream. The transport stream comprises plural programs as multiplexed. The transport stream is in a state compressed by means of MPEG 2 for example.

The decoder 5 separates a packet containing video data and audio data included in a broadcast program designated by the control section 2 from the transport stream outputted from the first demodulator section 4. Subsequently, the decoder 5 stores the data contained in the packet thus separated in the buffer memory 9 and reads the data out of the buffer memory 9 when required. Then, the decoder 5 separates video data and audio data from the data thus read out and expands and output the two types of data.

The video data signals outputted from the decoder 5 are inputted to the D/A converter section 8 via the OSD processing section 6.

The OSD processing section 6 superimposes characters or figures stored in the OSD image memory 7 upon a video image corresponding to the video data according to control signals given by the control section 2.

The D/A converter section 8 converts the video data signals outputted from the decoder 5 to analog video signals and outputs these analog video signals to an external television receiver 100.

The D/A converter section 8 also converts the audio data signals outputted from the decoder 5 to analog audio signals and outputs these analog audio signals to the external television receiver 100.

Thus, the television receiver 100 provides the user with image and sound which correspond to respective of the video signals and audio signals outputted from the D/A converter section 8.

While this embodiment includes the D/A converter section 8, D/A conversion is unnecessary if the external television receiver includes provisions for digital signals.

The filter section 12 frequency-separates the television broadcasting signals transmitted from the CATV station and outputs the signals thus frequency-separated.

The second demodulator section 13 demodulates an output from the filter section 12 into digital data, performs error correction to obtain control data and outputs the control data thus obtained. The control data is PSI (Program Specification Information)/SI (Service Information).

The table data obtaining section 14 obtains channel table data from the control data obtained by the second demodulator section 13 and outputs the channel table data thus obtained. The channel table data, which is included in the control data, comprises information describing all logical channels. The control data is data transmitted from the CATV station as occasion arises. The channel table data further comprises information on the correspondence between each logical channel and a demodulation frequency associated therewith and information on the logical channels as well as Source IDs directly identifying programs provided on the respective logical channels.

The storage section 15 comprises EEPROM for example.

The storage section 15 comprises two partitions; one forms a VCT (virtual channel table) 21 and the other forms a favorite channel table 22 (see FIGS. 2A and 2B). The VCT 21 stores therein the channel table data outputted from the table data obtaining section 14.

There are two forms of VCT, i.e., SVCT (Short Form virtual channel table) for general purpose and LVCT for expansion. This embodiment employs the former form. Description will be made of the main function of the VCT, with description of other functions thereof omitted.

FIGS. 2A to 2C each show the contents stored in the VCT 21 or the favorite channel table 22. Specifically, FIG. 2A shows the contents stored in the VCT 21; FIG. 2B shows the contents stored in the favorite channel table 22 in a state before update of a selected channel; and FIG. 2C shows the contents stored in the favorite channel table 22 in a state after update of a selected channel.

In the Source ID column of each of FIGS. 2A to 2C, the "0x" preceding a numeric value indicates that the numeric value is a hexadecimal digit.

As shown in FIG. 2A, the VCT 21 has stored therein logical channels and their respective Source IDs in such a manner as to make each logical channel and its Source ID correspond to each other according to the channel table data (control data).

The VCT 21 also has stored therein the correspondence between each logical channel and a demodulation frequency associated therewith.

The CATV digital broadcasting receiver 1 allows the user to designate a logical channel providing a favorite broadcast program as a favorite channel by the operating section 11 and register the favorite channel.

Specifically, the control section 2 extracts the logical channel designated by the operating section 11 and its corresponding Source ID and demodulation frequency from the VCT 21 and records these items in the favorite channel table 22 in such a manner as to make these items correspond to each other (FIG. 2B). The "FORMER CHANNEL" in each of FIGS. 2B and 2C will be described later in the description of step S3 in FIG. 3.

Here, the VCT 21 is equivalent to the "channel table" defined by the present invention, and the favorite channel table 22 equivalent to the "designated channel table" defined by the present invention. The storage section 15 forms the "channel table" and the "designated channel table" defined by the present invention. The tuner section 3, first demodulator section 4, decoder 5, buffer memory 9 and D/A converter section 8 form the "video/audio data obtaining section" defined by the present invention. The OSD processing section 6 and the OSD image memory 7 form the "OSD display section" defined by the present invention. The filter section 12 and the second demodulator section 13 form the "control data obtaining section" defined by the present invention. The control section 2 is equivalent to the "channel selecting section" defined by the present invention.

Figure 3:
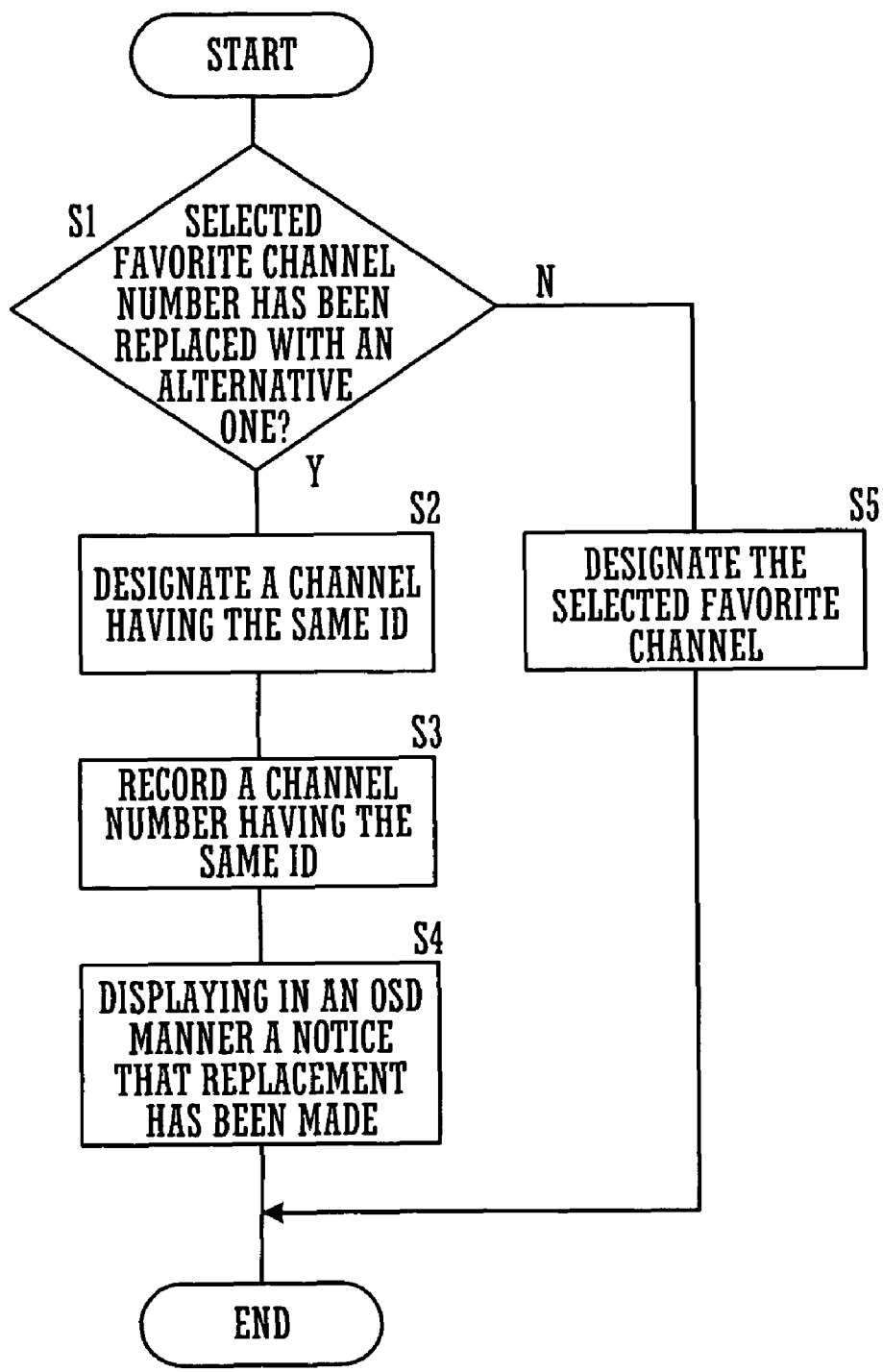
FIG. 3 is a flowchart of process steps of an operation performed by a control section of the CATV digital broadcasting receiver embodying the present invention.

FIG. 3 is a flowchart of process steps of an operation performed by the control section of the CATV digital broadcasting receiver embodying the present invention. This operation is performed when the user selects a favorite channel via a remote controller or the like.

When the user selects a favorite channel via the remote controller or the like, stated otherwise, when the favorite channel stored in the favorite channel table 22 is selected at the operating section 11 (see FIG. 2B), the control section 2 determines whether or not the selected channel has been replaced with an alternative channel by the broadcasting station (step S1).

This determination is made by reference to the VCT 21 and the favorite channel table 22 using a Source ID corresponding to the selected channel as a search key.

If the selected channel is "101" for example, the control section 2 first extracts a Source ID (0×002) corresponding to the selected channel "101" from the favorite channel table 22 (see FIG. 2B). Subsequently, the control section 2 extracts a channel having the same Source ID as the extracted Source ID (0×002) from the VCT 21 (see FIG. 2A). Here, the channel having the same Source ID as the Source ID (0×002) is "101" and, therefore, the selected channel is the same as the extracted channel. In this case it is determined by the control section 2 that the selected channel has not been replaced with any alternative channel.

Alternatively, if the selected channel is "100", the control section 2 first extracts a Source ID (0×004) corresponding to the selected channel from the favorite channel table 22 (see FIG. 2B). Subsequently, the control section 2 extracts a channel having the same Source ID as the extracted Source ID (0×004) from the VCT 21 (see FIG. 2A). Here, the channel having the same Source ID as the Source ID (0×004) is "103" and, therefore, the selected channel is not the same as the extracted channel. In this case it is determined by the control section 2 that the selected channel has been replaced with an alternative channel.

If it is determined in step S1 that the selected channel has been replaced with the alternative channel, the control section 2 instructs the tuner section 3 and the decoder 5 to select the alternative channel instead of the selected channel (step S2). Specifically, the control section 2 causes the tuner section 3 and the first demodulator section 4 to take the demodulation frequency corresponding to the alternative logical channel having replaced the selected logical channel while causing the decoder 5 to take the alternative logical channel. Thus, the television receiver 100 allows the user to view the broadcast program provided on the alternative logical channel.

Even if the logical channel number having provided a broadcast program, which is designated by the user, is replaced with an alternative channel number, the control section 2 automatically selects the alternative logical channel number currently providing that broadcast program in step S2. Accordingly, the user is no longer made to feel such troublesomeness as to check logical channels in order to find out the alternative logical channel again.

Subsequently, the control section 2 updates contents of the favorite channel table 22 so that the alternative channel is recorded instead of the selected channel (step S3).

If the selected channel is "100" for example, this channel has been replaced with an alternative channel by the broadcasting station as described above. Accordingly, the favorite channel table 22 (see FIG. 2B) is updated so that the alternative channel "103" is recorded therein as the favorite channel instead of the selected channel "100". Thus, in the favorite channel table 22, the favorite channel is changed to "103" and made to correspond to the Source ID (0×004) (see FIG. 2C).

Thereafter, when the user selects this favorite channel via the remote controller or the like, the control section 2 determines whether or not the favorite channel "103" has been replaced with an alternative one in step S1.

The favorite channel table 22 stores therein the former favorite channel "100" that was effective before replacement and the current favorite channel "103" in such a manner as to make these channels correspond to each other as shown in FIG. 2C. For this reason, the CATV digital broadcasting receiver 1 can retain information on the former channel and the current channel changed from the former channel.

Subsequently, the control section 2 instructs the OSD processing section 6 to display a notice to the effect that the selected channel has been changed (step S4) and then terminates the process. In response to this instruction, the OSD processing section 6 superimposes an OSD informing that the selected channel has been changed upon a video image formed based on video data. Then, the television receiver 100 displays the notice to the effect that the selected channel has been changed in an OSD manner, whereby the CATV digital broadcasting receiver 1 can provide the user with the notice to that effect.

Such a notice to be displayed is, for example, "The registered favorite channel number providing your favorite broadcast program has been changed." or "The registered favorite channel number providing your favorite broadcast program has been changed from channel 101 to channel 103." The notice "The registered favorite channel number providing your favorite broadcast program has been changed from channel 101 to channel 103." can be displayed because the favorite channel table 22 has stored therein the former favorite channel "100" that was effective before the channel replacement and the current favorite channel "103" in such a manner as to make these channels correspond to each other (see FIG. 2C).

Thus, the user can be notified of the fact that the channel number designated by the user has been changed.

If it is determined in step S1 that the selected channel has not been replaced with any alternative channel by the broadcasting station, the control section 2 instructs the tuner section 3 and the decoder 5 to select the selected channel (step S5) and then terminates the process. Specifically, the control section 2 causes the tuner section 3 and the first demodulator section 4 to take the demodulation frequency corresponding to the selected logical channel while causing the decoder 5 to take the selected channel.

While only certain presently preferred embodiments of the present invention have been described in detail, as will be apparent for those skilled in the art, certain changes and modifications may be made in embodiments without departing from the spirit and scope of the present invention as defined by the following claims.

What is claimed is:

1. A digital broadcasting receiver comprising:
   an operating section configured to select a logical channel;
   a video/audio data obtaining section configured to receive television broadcasting signals, extract one of the television broadcasting signals provided on a selected logical channel, and obtain video data and audio data on the selected logical channel from the television broadcasting signal;
   an output section configured to output to a television receiver a video signal and an audio signal based on the video data and the audio data obtained by the video/audio data obtaining section;
   a control data obtaining section configured to obtain control data transmitted from a broadcasting station;
   a virtual channel table configured to store therein a logical channel and a Source ID for directly identifying a broadcast program provided on the logical channel in such a manner as to make the logical channel and the Source ID correspond to each other based on the control data obtained by the control data obtaining section, the virtual channel table allowing the logical channel and the Source ID to be updated upon receipt of television broadcasting signals;
   a designated channel table configured such that, when a user designates a logical channel to be registered by operating the operating section, a Source ID associated with the designated logical channel is extracted from the virtual channel table, and then the designated channel table stores therein the designated logical channel and the Source ID in such a manner as to make the designated logical channel and the Source ID correspond to each other;
   a channel selecting section configured such that when the logical channel stored in the designated channel table is selected by the operating section, the channel selecting section extracts from the designated channel table a Source ID associated with the selected logical channel, then extracts from the virtual channel table a logical channel having the same Source ID as the extracted Source ID, and when the extracted logical channel is not the same as the selected logical channel, the channel selecting section determines that the selected logical channel has been replaced with an alternative channel by the broadcasting station; and
   an OSD display section configured to cause the television receiver to display a desired OSD, wherein
   if determining that the selected logical channel has been replaced with the alternative channel by the broadcasting station, the channel selecting section causes the video/audio data obtaining section to select the extracted logical channel instead of the selected logical channel,
   the output section outputs to the television receiver the video signal and the audio signal based on the video data and the audio data on the extracted logical channel, and
   if the channel selecting section determines that the selected logical channel has been replaced with the alternative channel by the broadcasting station, the OSD display section causes the television receiver to display a first OSD which shows the selected logical channel has been changed.

2. The digital broadcasting receiver according to claim 1, wherein if it is determined that the selected logical channel has been replaced with the alternative channel by the broadcasting station, the designated channel table stores therein the extracted logical channel as the previously logical designated channel instead of the selected logical channel.

3. The digital broadcasting receiver according to claim 2, wherein
   the designated channel table further stores therein the selected logical channel and the extracted logical channel in such a manner as to make these channels correspond to each other, when the selected logical channel has been replaced with the alternative channel by the broadcasting station, and the OSD display section causes the television receiver to display a second OSD which shows a channel number of the selected logical channel and a channel number of the extracted logical channel.

\* \* \* \* \*